Nov. 29, 1960 J. MAHLER 2,962,669
MODULATOR OF THE ON/OFF TYPE
Filed Aug. 30, 1957
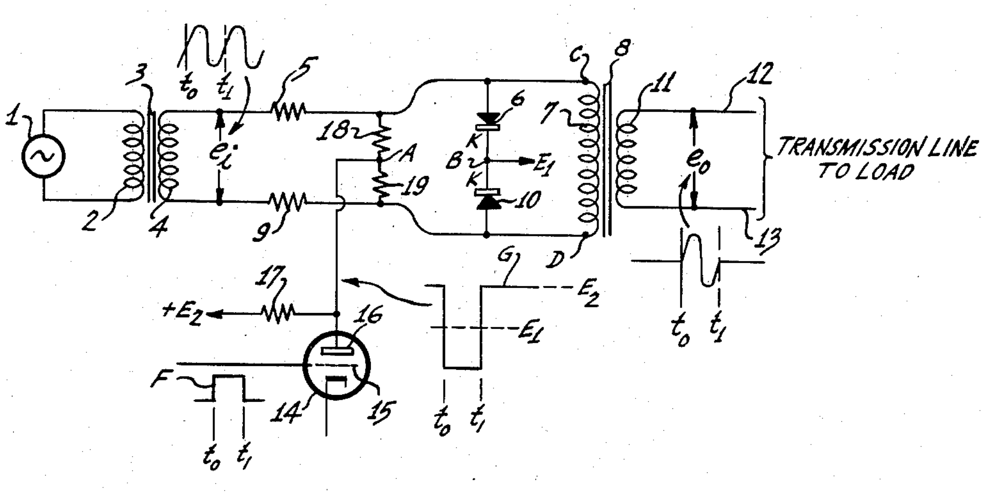
INVENTOR.
JOSEPH MAHLER
BY
F. A. Rechif
ATTORNEY United States Patent Office 2,962,669

Patented Nov. 29, 1960

2,962,669

MODULATOR OF THE ON/OFF TYPE

Joseph Mahler, Erlton, N.J., assignor to Radio Corporation of America, a corporation of Delaware Filed Aug. 30, 1957, Ser. No. 681,206

4 Claims. (Cl. 332—9)

This invention relates to a modulator of the on/off type, that is, a modulator which either allows or prevents the transmission of an input signal to an output circuit in response to a modulating or control signal, which latter may be in the form of a pulse or train of pulses. Such a modulator may be thought of as a controllable switch, by means of which one signal may be on/off switched to an output circuit under the control of another (modulating) signal.

An object of this invention is to provide a novel modulator of the on/off type.

Another object is to provide a simple yet efficient circuit by means of which an input signal may be controllably switched to an output circuit in response to a control signal, without any appreciable distortion of the input signal waveform and without any appreciable switching transients.

The objects of this invention are accomplished, briefly in the following manner:

A pair of diodes are connected back-to-back (in series opposition) between the two conductors of a line across which is applied an input wave to be on/off keyed or on/off modulated. A constant reference voltage is applied to the common junction of these diodes. A modulating or control voltage, which may be in the form of a pulse or a series of pulses, is applied effectively in parallel to the electrodes of the two diodes which are remote from their common junction, to cause the diodes to conduct for maximum attenuation or "off" modulation of the input wave, or alternatively to keep the diodes cut off for maximum transmission or "on" modulation of the input wave. The modulating or control voltage is made to have such an amplitude and polarity, with respect to the reference and input voltages, as to keep the diodes cut off during the entire cycle of the input wave for "on" modulation or maximum transmission.

A detailed description of the invention follows, taken in conjunction with the accompanying drawing, wherein the single figure is a circuit diagram of an arrangement according to this invention, together with typical waveforms at various points in the circuit.

Referring now to the drawing, a voltage wave that is to be keyed or on/off modulated in a load or output circuit is applied from a suitable source 1 to the primary winding 2 of an input transformer 3, which may be a step-up transformer. The voltage wave supplied by source 1 may for example be sinusoidal in shape, so that the voltage $e_1$ across the terminals of the secondary winding 4 of transformer 3 is also sinusoidal in form, as represented by the waveform adjacent these terminals. The terminals of winding 4 may be considered to be the input terminals of the modulation system of the invention. The voltage wave $e_1$ may be thought of as the input voltage or input wave to the modulation system of this invention. By way of example, this voltage wave is to be keyed or modulated "on" in a load circuit during the time interval from $t_0$ to $t_1$, which time interval may be that occupied by one full cycle of the sine wave input.

The circuit of the invention may be used to pulse modulate or on/off modulate a sinusoidal voltage wave so as to transmit to a load individual sine wave cycles (such as the cycle occurring between $t_0$ and $t_1$) grouped in accordance with an on/off pulse code.

The modulator of this invention uses a pair of keyed or controlled diodes (either of the semiconductor or vacuum tube type) as an effective short circuit across the transmission line to the load, during "off" modulation periods, to prevent the transmission of the input voltage $e_1$ to the load; during "on" modulation periods such as from $t_0$ to $t_1$ these diodes are so controlled as to have a high impedance, thus allowing the transmission of the input voltage $e_1$ to the load.

One end of secondary winding 4 is connected through a resistor 5 to the anode of a diode 6 and also to one end C of the primary winding 7 of an output transformer 8, which may be a stepdown transformer. The other end of winding 4 is connected through a resistor 9 to the anode of a diode 10 and also to the other end D of primary winding 7. The cathode of diode 6 (denoted by the symbol K) and the cathode of diode 10 (also denoted by the symbol K) are connected together at point B and from this common junction a connection extends to a source of reference voltage $E_1$. Reference voltage $E_1$ may be either positive, negative, or zero (ground) potential, the value of voltage selected being chosen to complement the voltages used in or available to the associated circuitry. Further explanation of this will be made hereinafter.

Opposite ends of the secondary winding 11 of the transformer 8 are connected to the respective conductors 12 and 13 of a transmission line leading to a load in which on/off modulation of a sinusoidal voltage wave is desired to be produced. The output voltage $e_0$ may for purposes of illustration be considered as the voltage across the winding 11, although the terminals C and D may be considered to be the output terminals of the modulation system of the invention.

In order to produce on/off modulation of the input voltage wave $e_1$ at the output terminals C, D (which output terminals are adapted to be connected to a load by way of transformer 8), a control or modulating voltage, for example in the form of a series of pulses comprising a pulse code, is applied in parallel to the diodes 6 and 10. This is done through the agency of an electron flow control device 14, such as a vacuum tube having at least three electrodes and biased to be normally nonconducting or cut off but made conducting in response to a positive-going voltage applied to its control electrode 15. As represented by waveform F, the voltage applied to the electrode 15 has a positive-going portion during the intervals (such as from time $t_0$ to time $t_1$) when "on" modulation of the voltage wave $e_1$ is desired in the load. The voltage applied to electrode 15 may then be a series of pulses comprising a pulse code corresponding to the coded individual sine wave cycles desired in the load.

The anode 16 of tube 14 is connected by way of a suitable resistor 17 to the positive terminal of a source of unidirectional potential of value $E_2$. When tube 14 is nonconducting or cut off, the voltage at anode 16 or point A (represented by waveform G) has the value $E_2$, but when this tube conducts (as during the interval from $t_0$ to $t_1$) this voltage drops to a lower value, determined by the value of resistor 17 and the current flowing through this resistor.

A connection extends from point A through a resistor 18 to the anode of diode 6 (point C), and a connection extends from point A through a resistor 19 to the anode of diode 10 (point D). Resistors 18 and 19 are equal to each other, so points C and D are effectively at the same D.C. potential. Thus, the diodes are connected effectively in parallel to any D.C. potential appearing between points A and B. However, the diodes 6 and 10 are connected effectively in series opposition across points C and D, insofar as the voltage $e_i$ is concerned. The resistors 18 and 19 and the diodes 6 and 10 together are arranged somewhat in the fashion of a bridge circuit, with the modulating voltage (pulsating D.C.) being applied between the two diagonally-opposite terminals A and B, the voltage wave to be on/off modulated being applied between the two diagonally-opposite terminals C and D, and the load connected essentially between the two diagonally-opposite terminals C and D.

Prior to the time $t_0$, the voltage at point A or anode 16 has the value $E_2$, since tube 14 is then cut off. The voltages $E_2$ and $E_1$ have such values that, during the time desired for "off" modulation of the input voltage wave $e_i$ (when the voltage at point A has the value $E_2$), point A is more positive than point B (voltage $E_1$) by an amount at least equal to one-half the peak value of the alternating input voltage $e_i$. This is illustrated in waveform G before time $t_0$ and after time $t_1$, the values of $E_2$ and $E_1$ being indicated on this waveform. The application of a voltage of this magnitude (compared to $E_1$ and $e_i$) to point A results in the diodes 6 and 10 having an extremely low value of resistance, since the voltage applied to point A is effective on the anodes of the diodes and since this voltage is sufficiently greater (more positive) than the voltage $E_1$ applied to the cathodes of the diodes. Both diodes are then biased on or kept conducting, effectively short-circuiting the terminals C and D and keeping the signal voltage therebetween extremely low. The input signal $e_i$ is thus attenuated, resulting in "off" modulation in the load coupled to terminals C and D. "Off" modulation prior to time $t_0$ and subsequent to time $t_1$ is represented by the straight horizontal line portions of the waveform illustrating the output voltage $e_0$, at these times.

At the time $t_0$, and extending over to the time $t_1$, a positive-going voltage is applied to grid 15 of tube 14, causing this tube to conduct and lowering the voltage at point A or anode 16 below the value $E_2$, as illustrated by waveform G. The value of resistor 17, and the current drawn through this resistor, are of such magnitudes that, during the time desired for "on" modulation of the input voltage wave $e_i$ (that is, between $t_0$ and $t_1$, point A is more negative than point B (voltage $E_1$) by an amount at least equal to one-half the peak value of the alternating input voltage $e_i$. This is illustrated in waveform G between times $t_0$ and $t_1$. The application of a voltage of this magnitude (compared to $E_1$ and $e_i$) to point A results in the diodes 6 and 10 having an extremely high value of resistance, since the voltage applied to point A is effective on the anodes of the diodes and since this voltage is sufficiently less (more negative) than the voltage $E_1$ applied to the cathodes of the diodes. Both diodes are then effectively cut off or biased off, removing the signal short-circuit from across the terminals C and D. The input signal $e_i$ is then not shunted or attenuated, resulting in "on" modulation in the load coupled to terminals C and D. "On" modulation between times $t_0$ and $t_1$ is represented by the sinusoidal portion of the waveform illustrating the output voltage $e_0$, between these two times. In this manner, an individual sine wave cycle (of the same waveform as input voltage wave $e_i$) may be transmitted to the load during each "on" modulation interval, that is, during each positive-going portion of the modulating voltage applied to grid 15.

In a modulation system arrangement built according to this invention and successfully tested, the ratio of "on" to "off" signal in the load was better than 50 db. The following values for certain of the components are given by way of example. These were the values used in the arrangement which was built and successfully tested.

| Resistor: | Ohms |
|---|---|
| **5** | 2200 |
| **9** | 2200 |
| **18** | 22,000 |
| **19** | 22,000 |

In the circuit described there is some insertion loss, due to the series resistors 5 and 9, but this is small because the values of these resistors are small compared to the load impedance reflected between points C and D.

The system of this invention either allows or prevents the transmission of an input voltage in accordance with a modulating voltage, which latter may be in the form of a pulse code. This on/off modulation is accomplished without any appreciable signal distortion or switching transients. The present system may be used to produce an on/off modulated signal at low impedance for line transmission. It can also be used for "chopping" and sampling" of signal voltages, as in telemetering and other information sampling operations.

If desired, the diodes 6 and 10 can both be connected with their polarities reversed. In such case, point A would be made more negative than point B for diode conduction ("off" modulation in the load) and more positive than point B for diode cutoff ("on" modulation in the load).

In the modulator of the present invention, there is essentially a short-circuit across the transmission line 12, 13 when the signal is blocked (for "off" modulation in the load), due to the action of diodes 6 and 10. As a result of this low impedance across the transmission line, the noise immunity of the circuit output is highest under these conditions, when the signal is blocked from the output. Any noise then picked up by the transmission line is shunted away from the load. This characteristic, that the noise immunity of the circuit output is highest when the signal is blocked from the output, is very desirable, since it reduces the likelihood of noise being mistaken for signal during such periods. This feature is particularly important for long transmission lines, or for low level signals. On the other hand, in other types of modulators there is a high impedance across the transmission line when the signal is blocked, this high impedance resulting in the noise immunity of the circuit output being lowest at this time. This is very undesirable, since then noise could easily be mistaken for signal.

What is claimed is:

1. In a system for on/off modulation of a voltage wave in response to a modulating voltage, a two-conductor line having input terminals and having output terminals adapted to be connected to a load; a pair of diodes connected in series opposition across said conductors and between said output terminals through connections devoid of concentrated impedance, means for impressing said voltage wave on said input terminals, means for applying a reference voltage to the common junction of said diodes, a resistor bridged across said transmission line, and means connected to a point between the ends of said resistor for applying said modulating voltage in parallel to those electrodes of said diodes adjacent the conductors of said line so as to cause both of said diodes to conduct, thereby attenuating said voltage wave, throughout the time desired for "off" modulation of said voltage wave and so as to bias both of said diodes off, thereby allowing transmission of said voltage wave to said output terminals without appreciable attenuation thereof, throughout the time desired for "on" modulation of said voltage wave.

2. A modulation circuit comprising a two-conductor line having input terminals and having output terminals adapted to be connected to a load; means for applying an alternating voltage to be modulated to said input terminals, a pair of non-linear controllable resistance devices connected in series between said output terminals, means for applying a reference voltage to the common junction of said devices, and means connected to a point between said devices for applying a modulating voltage in parallel to both of said devices, said modulating voltage having such an amplitude and polarity with respect to said reference voltage and to the peak alternating voltage across said input terminals as to cause both of said devices to have a high value of resistance, thereby allowing transmission of said alternating voltage to said output terminals without appreciable attenuation thereof.

3. A modulation circuit comprising a two-conductor line having input terminals and having output terminals for connection to a load, means for applying an alternating voltage to be modulated to said input terminals, a pair of non-linear controllable resistance devices connected in series between said output terminals, means for applying a reference voltage to the common junction of said devices, a resistor bridged across said transmission line, an amplifying device having a plurality of electrode terminals, means for biasing said amplifying device to cutoff, means to apply a modulating voltage having positive going voltage excursions to one of said electrode terminals whereby to render said amplifying device conductive, means for connecting another of said electrode terminals to a point between the ends of said resistor, means including a series resistor to apply a positive voltage to said electrode terminal connected to said point between the ends of said resistor, said applied positive voltage having a value more positive than the value of said reference voltage when said amplifying device is cut off.

4. A modulation circuit comprising a two-conductor line having input terminals and having output terminals for connection to a load, means for applying an alternating voltage to be modulated to said input terminals, a pair of diodes connected in series opposition between said output terminals, means for applying a reference voltage to the common junction of said diodes, a resistor bridged across said transmission line, an amplifying device having a plurality of electrode terminals, means for biasing said amplifying device to cutoff, means to apply a modulating voltage having positive going voltage excursions to one of said electrode terminals whereby to render said amplifying device conductive, means for connecting another of said electrode terminals to a point between the ends of said resistor, means including a series resistor to apply a positive voltage to said electrode terminal connected to said point between the ends of said resistors, said applied positive voltage having a value more positive than the value of said reference voltage when said amplifying device is cut off.

References Cited in the file of this patent

UNITED STATES PATENTS

| | | |
|---|---|---|
| 2,304,135 | Wise | Dec. 8, 1942 |
| 2,453,078 | Posthumus | Nov. 2, 1948 |
| 2,545,250 | Appert | Mar. 13, 1951 |
| 2,695,988 | Gray | Nov. 30, 1954 |
| 2,782,372 | Barditch | Feb. 19, 1957 |
| 2,804,595 | Soffel | Aug. 27, 1957 |

FOREIGN PATENTS

| | | |
|---|---|---|
| 473,330 | Great Britain | Oct. 6, 1937 |